Dec. 9, 1941.  J. J. RING ET AL  2,265,929
PRIME MOVER CONTROL SYSTEM
Filed March 28, 1938
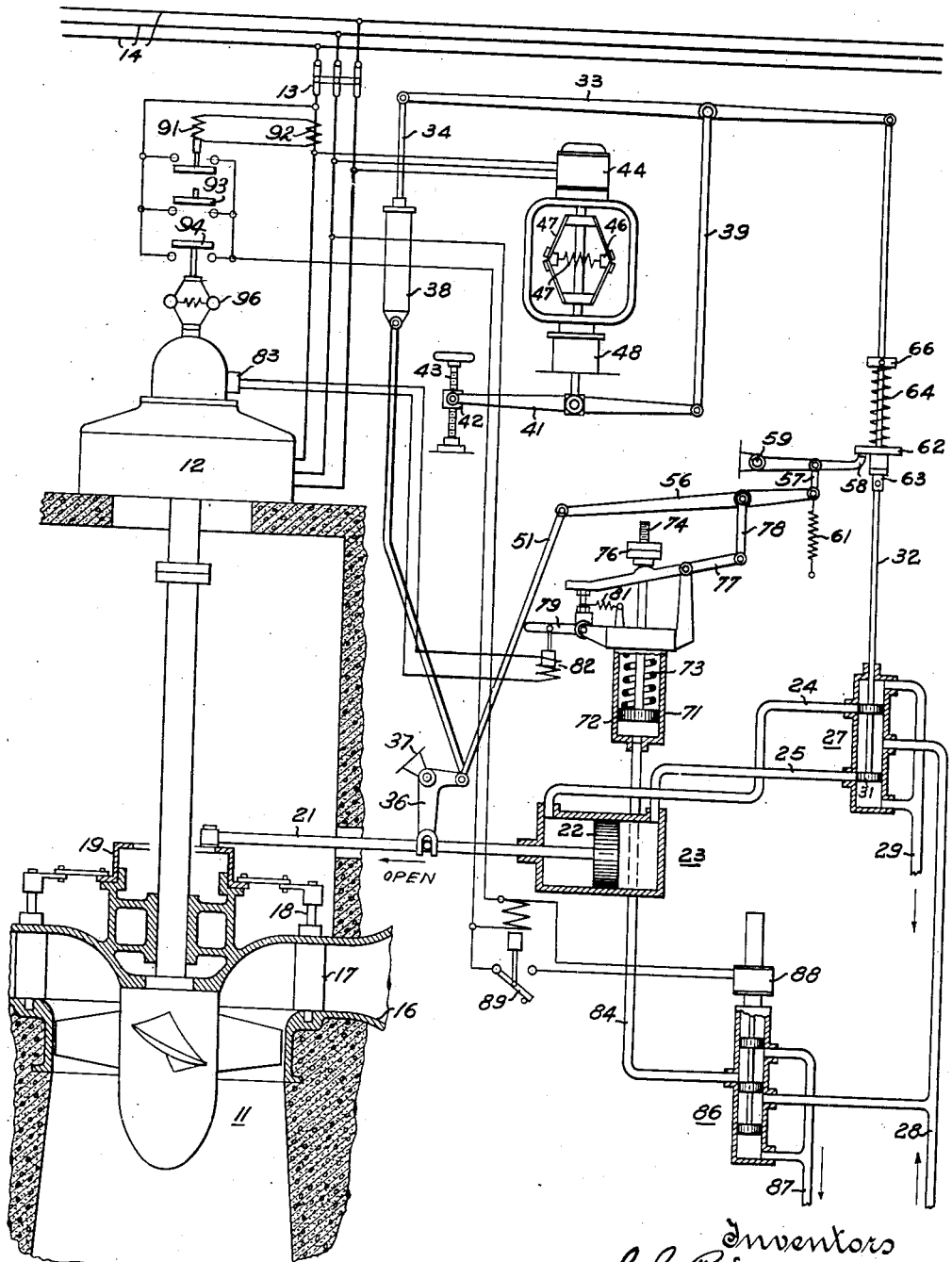
Inventors
J. J. Ring
B. R. Nichols
by [signature]
Attorney Patented Dec. 9, 1941

2,265,929

UNITED STATES PATENT OFFICE 2,265,929

PRIME MOVER CONTROL SYSTEM

Joseph J. Ring and Beverly R. Nichols, Wauwatosa, Wis., assignors to Allis-Chalmers Manufacturing Company, Milwaukee, Wis., a corporation of Delaware Application March 28, 1938, Serial No. 198,354

4 Claims. (Cl. 137—158)

This invention relates in general to control systems for prime movers and more particularly to control systems for prime movers driving electric generators in which means are provided to automatically establish normal or synchronous speed, no load condition of the prime mover generator unit upon the occurrence of overspeeds, overloads, overvoltages, low voltages, excessive prime mover temperatures and the like, during operation of the prime mover.

With the introduction of supersensitive governors, such as disclosed in Patent No. 2,106,684, J. J. Ring, B. R. Nichols and A. Pfau, January 25, 1938, into regulating systems of fluid pressure operated prime movers such as hydraulic turbines, the flyball movements are comparatively large for small speed changes. The usual restoring mechanism for the pilot or regulating valve will therefore return the piston of the pilot valve to neutral or midposition before the usual gate and guide vanes have moved an appreciable amount toward the closing or shutdown position. The above condition increases the possibility that the prime mover may overspeed or run away provided the gate vanes are fully open at the time the overspeed control or other protective means attempts to slow down the prime mover.

To avoid such possibility, an overspeed control is provided by the present invention, to operate a control valve which may be actuated electrically or mechanically and which in turn actuates a shutdown device causing the piston of the pilot valve to remain in a gate closing position until the prime mover has attained normal speed or synchronous speed no load condition. As soon as the prime mover is at synchronous speed at no load, the piston of the pilot valve returns to midposition and the prime mover is in the proper condition to immediately assume a load without first requiring synchronization of the prime mover generator unit with other units which may be connected with the same line of distribution. It will be apparent that the above method of control also eliminates undesirable hunting of the unit when the system is subjected to new load conditions.

The shutdown means incorporate a protective device combined with a maximum load or power output limit mechanism. It is at times desirable to limit the power output of the prime mover or to operate a prime mover such as a hydraulic turbine with the gates blocked so that movement thereof beyond a predetermined amount is made impossible. The limited maximum gate opening may be adjusted at any time and to any desired degree. The protective device itself provides means for modifying the action of the load or power output limit mechanism dependent on manual control, speed responsive control, power output control or other control responsive to a normal condition of the unit and also provides for operation of the modifying means by protective devices responsive to abnormal conditions of the unit. Essentially, the modifying means includes a lever connected with the power output limit mechanism and having an adjustable force acting thereon, which force is shown herein as being a fluid pressure operated control piston. Adjustment of the force, that is, of the position of the piston, is obtained by means of a solenoid operated valve which is energized upon closure of a manual or speed or current responsive switch. The position of the lever itself is directly controlled by removal or replacement of the fulcrum about which the lever acts.

It is therefore an object of the present invention to provide a prime mover control system with a plurality of means cooperating to retain the operation of the prime mover within its most efficient limits.

Another object of the invention is to provide a prime mover control system with a plurality of protective means to limit the maximum power output at which the prime mover may operate, by a limitation of the degree of closure of the gate controlling the flow of operating fluid to the prime mover.

Another object of the invention is to provide a prime mover control system with means cooperating to permit only a gate opening of the prime mover corresponding to synchronous speed no load condition upon energization of protective means associated with the prime mover which nullify the effect of conditions tending to cause abnormal speed or load conditions.

Another object of the invention is to provide a prime mover control system with a plurality of protective means cooperating to allow maintenance of the prime mover speed within predetermined limits to thereby keep an electric generator operated by the prime mover in synchronism with an electric system of distribution supplied with power from other units connected therewith, upon occurence of overspeed of the prime mover or upon the operation of any protective devices responsive to other conditions of the prime mover.

Objects and advantages other than those above set forth will be apparent from the following description, when read in connection with the accompanying drawing, in which the single figure diagrammatically illustrates one embodiment of the invention shown as being applied to a hydraulic turbine operating an electric generator and in which the various portions of the control system are shown in diagrammatic form to facilitate comprehension thereof.

Referring more specifically to the drawing by characters of reference, the improved control system is herein shown as being applied to a prime mover which is a hydraulic turbine 11 of the propeller type, driving an alternating current generator 12 connected by conventional switchgear 13 with a well known system of distribution 14. The turbine 11 comprises the usual spiral casing 16 which connects with a source of fluid under pressure and which forms a peripheral inlet for the fluid pressure to the turbine and in which inlet are mounted a series of movable gate and guide vanes 17 for controlling both the quantity and the direction of the flow of fluid under pressure to the turbine runner. The gate vane stems 18 are journaled at the top and bottom in the casing 16 and the upper portions of the stems extend beyond the casing sufficiently to provide for a conventional linkage thereof with a shifting ring 19 which is to be rotated into different operating positions and to thereby control the flow of fluid to the turbine. The shifting ring 19 is pivotally connected by a rod 21 with the piston 22 of a fluid pressure operated servomotor 23. The servomotor 23 is connected on the several sides of the piston thereof, with fluid pressure from a source (not shown) through pipes 24 and 25, a pilot valve 27 and a supply pipe 28, the fluid discharging from the servomotor through either pipes 24 or 25, the pilot valve 27 and a discharge pipe 29. When the quantity of water admitted to the turbine 11 is to be varied for any reason, the position of the gate vanes 17 is varied by movement of the shifting ring 19 by the servomotor 23. The servomotor 23 is actuated by fluid pressure admitted thereto or discharged therefrom upon movement of the valve body 31 of the pilot valve 27 to connect the servomotor with the supply pipe 28 or with the discharge pipe 29, as is well known.

The pilot valve body 31 is pivotally connected by a rod 32 with one end of a lever 33. The other end of the lever 33 is pivotally connected with a rod 34 which is connected with one arm of a bell crank 36 mounted on a stationary pivot 37 and having the other arm thereof connected by a fork and pin connection with the connecting rod 21 between the piston of the servomotor and the shifting ring. The rod 34 is provided with the usual dashpot 38 intermediate its ends. Any movement of the servomotor 23 is thus relayed back to the pilot valve body 31, as will be explained hereinafter. The lever 33 is connected at a point intermediate its ends with a link 39 having its other end connected with a lever 41. The lever 41 has one end thereof connected with a nut 42 movable up or down on a threaded screw 43 provided with a hand wheel or other means for rotating of the screw. The movement of the lever 33, which has no fixed fulcrum and is therefore designated a floating lever, and hence of the pilot valve body 31, may be varied by the movement of the nut 42 to adjust the speed and hence the frequency of the generator 12 to synchronism with other generators connected with the line 14.

A point intermediate the ends of the lever 41 is connected with a supersensitive governor, such as disclosed and claimed in the above identified patent, and which comprises generally a high speed electric motor 44 operating from and in synchronism with the distribution line 14 at a speed equal to or proportional to the speed of the turbine 11, and driving flyballs 46 mounted on springs 47 so as to be easily movable by large amounts for small load changes, and a servomotor 48 with a balanced internal pilot valve which is the only portion of the governor dependent on the flyballs for its actuation, the servomotor 48 providing all of the power required for actuation of the pilot valve body 31. Due to the absence of friction points, and to the fact that the flyballs need not exert any material force to secure a governing movement, the governor will render service indefinitely without change in its accuracy or sensitivity.

The control system described thus far does not, however, prevent the turbine from reaching excessive speed or from even running away if the load is thrown off suddenly at large gate openings, for the reason that the highly sensitive governor produces large flyball movements for small speed changes which result in pilot valve body and servomotor movements returning the pilot valve body to midposition by means of the restoring leverage before the gate vanes have been able to close. Neither does the system described so far prevent the turbine gate from being fully closed, in which case the generator would have to be synchronized again before load could be taken on. To meet the above mentioned contingencies, it has been found advantageous to provide a control system including a load or power output limit device cooperating with a shutdown device which will bring the turbine to normal speed no load operation upon the occurrence of a predetermined overspeed, excessive overload, or other undesired conditions. As soon as the cause of the overspeed, overload or other condition is eliminated, the unit being at synchronous speed is again immediately ready to take up a load.

The load or power output limit device includes a rod 51 pivotally connected at one end to one arm of the bell crank 36. The other end of the rod 51 is connected by a lever 56 connected by a link 57 with a control finger 58 pivotally mounted at a fixed point 59. The entire load linkage described immediately above is biased for clockwise movement of the finger 58 by a spring 61. The finger 58 extends into the path of movement of a collar 62 which is normally held against a fixed collar 63, on the pilot valve stem 32, by a spring 64 abutting against a second fixed collar 66. In the position shown with the gate, servomotor piston 22 and the pilot valve body 31 in midposition, the positions of the several parts above mentioned are so adjusted that the control finger 58 is just out of engagement with the collar 62. If an increased load is imposed on the generator 12, the speed of the unit 11, 12 decreases and the governor 44—48 causes pilot valve body 31 to move downward to apply pressure to the right hand side of the servomotor 23 to open the turbine gate 17. Such downward movement of the pilot valve body brings collar 62 into engagement with control finger 58. Movement of the servomotor piston 22 also moves bell crank 36 which moves the remainder of the load limiting linkage 51—57 and causes the finger 58 to press upwardly against the collar 62 which moves the collar 62 upwardly, thereby compressing the spring 64 and urging the pilot valve body 31 back to its midposition.

The above load limiting mechanism does not, however, produce such operation of the pilot valve as will cause a return of the unit and of the entire system to synchronous speed no load condition at which the unit may be put under load immediately after the overspeed, overload or other abnormal conditions have been overcome. The means used to obtain such action are herein termed a shutdown device and are mechanically, hydraulically and electrically interconnected with other portions of the system above described. A cylinder 71 is mounted in a conveniently adjacent relation with respect to the load limiting linkage and particularly with respect to the lever 56 of such linkage. A piston 72 is arranged within the cylinder 71 and is kept under the action of a spring 73. The piston rod 74 extends up beyond the end of the cylinder 71 and is provided with nuts 76 which are adjustable along the rod and which are engaged by a cam surface on a lever 77 pivotally mounted on the cylinder 71 intermediate the length of the lever which is connected at one end by a link 78 with the load limiting lever 56. The other end of the cam lever 77 is arranged to engage with a bell crank 79 mounted on the cylinder 71 and having one arm thereof formed as a set screw to adjust the length of such arm. The bell crank is normally held by a spring 81 with the adjustable arm in such position as to allow the end of the lever 77 to rest thereon. The other arm of the bell crank 79 is connected with suitable mechanical or electrical means responsive to overspeed, overload, excessive temperature and the like abnormal operating conditions, and is shown as the armature of a solenoid 82 which is energized in response to a thermal relay or cutout of any usual construction mounted on a bearing or on the generator 12 and indicated thereon at 83. The space within the cylinder 71 below the piston 72 is connected by a pipe 84 and a valve 86 with the pipe 28 supplying fluid pressure to the other portions of the control system, and is also connected through the valve 86 with a discharge pipe 87. Valve 86 is actuated by suitable mechanical or electrical means responsive to overspeed, overload, excessive temperature and the like abnormal operating conditions, and is shown as a solenoid 88 which holds the valve 86 in a raised position and which is controlled by a relay 89. The relay 89 is in turn energized from the distribution line upon either the closure of the contacts of a relay 91 supplied from a current transformer 92 connected between the generator 12 and the distribution line 14; the closure of a manually operable switch 93; or the closure of the contacts of a speed operated switch 94 herein shown as being actuated by a set of flyballs 96 driven by the generator 12.

The automatic shutdown device combined with the power output limit mechanism prevents operation, under abnormal conditions, of the generating unit. Upon deenergization of the solenoid 88, the pistons of valve 86 move downwardly to midposition, thereby opening the cylinder 71 to discharge, and the piston 72 moves downwardly due to the effect of the compression spring 73. Inasmuch as the left hand end of the cam lever 77 is constantly urged toward the nuts 76 on the rod of the piston 71 by spring 61 acting on levers 56 and 77, the cam lever will follow the movement of the piston 72 until the downward movement thereof is limited by the contact with the adjustable arm of the bell crank 77 which forms a trigger biased to the vertical position by the spring 81. The cam lever 77 is connected with the load limiting linkage and with the pilot valve compensating or restoring relay mechanism so as to raise the finger 58 to no load position, while the pilot valve body is being restored into midposition. The amount of closure of the gate opening is therefore dependent upon the setting of the adjustable arm of the trigger 79. Because the motion of the bell crank 36 is in direct ratio to the movement of the gate 17, the adjusting arm may be so set as to produce a gate opening which corresponds to any predetermined speed or power output desired. If it is desired to shut down the turbine completely, the trigger 79 may be pulled from under the cam lever 77, either manually or automatically. One method of automatic tripping of the trigger 79 is shown in which the thermal cutout 83 is mounted on the thrust bearing or other portion of the generator, and is adapted to energize the solenoid 82 if the bearing or other temperature should exceed a predetermined value.

Referring now to the operation of the control system, the elements thereof are shown in positions which correspond with synchronous speed no load position, that is, the position which is produced by operation of any of the protective devices. The sequence of operations necessary with the system will, however, be considered from a position when the turbine is at rest, that is, when the gate 17 is closed, when the circuit of solenoid 82 is open, and when the relay 89 and hence the solenoid 88 of the valve 86 are deenergized for the reason that the circuit breaker 13 is open prior to the starting of the unit. Before starting the unit, relay 89 must be closed manually, but it will be held closed by its coil as soon as the generator 12 produces current. The servo-motor piston 22 is in its right hand end or gate closed position, the control finger 58 has been moved downwardly and away from collar 62, thus permitting the unit to be started by turning the synchronizing screw 43 in a direction to raise nut 42 and to lower the pilot valve body 31, and thereby admit operating fluid to the right hand side of the servomotor piston 22, which gradually opens the gate 17 of the turbine until its speed is in synchronism with other units connected with the distribution line. The generator 12 having reached normal operating speed, the motor 44 is energized to drive the flyballs 46, 47 and the synchronizer 42, 43 is left at its then adjustment, thus shifting complete control of the unit to the control system. As soon as the generator produces current, the solenoid 88 is energized to raise valve 86, thus causing the piston 72 of the shutdown device to move against the compression spring 73 and at the same time elevating the position of the adjusting nuts 76. The cam lever 77, due to the action of the spring 61, will therefore follow the adjusting nut 76 and the spring 61 will pull the control finger 58 farther away from the collar 62.

In view of the fact that the governor employed in the system is of the highly sensitive type and produces a relatively large flyball movement for small speed changes and because of the fact that the pistons 31 of the pilot valve 27 follow the movement of the gate almost instantly, hunting of the prime mover is practically eliminated. The relay or restoring connections 33—36 will therefore restore the pilot valve body 31 to neutral position before the gate 17 has moved more than a relatively small amount. Such immediate return of the pilot valve to midposition creates a dangerous situation for a turbine, especially at large gate openings, if the load is reduced suddenly, whereupon the turbine speed may rise to an excessive value. To provide against such runaway or excessive speed, an overspeed switch 94, 96 is provided which will trip at a predetermined overspeed, thereby opening the circuit to relay 89. Solenoid 88 is then deenergized, whereupon the pistons of the valve 86 move downwardly, thereby discharging operating fluid from the cylinder 71. The compression spring 73 causes downward movement of the piston 71 until such movement is stopped by movement of the adjusting nuts 76 against lever 77 and abutment of the left hand end of the lever 77 against the arm of the trigger 79. The right hand end of the cam lever 77 meanwhile pushes link 73, lever 56, link 57 and control finger 58 into engagement with the collar 62 and raises the valve stem 32 sufficiently to direct operating fluid into the left hand or closing side of the servomotor 23. The degree of movement of the piston 22 in a closing direction is therefore determined by the adjustment of the vertical arm of the bell crank trigger 79 which is such as to produce synchronous speed no load positioning of the gate 17.

The load limit leverage is interconnected with the automatic shutdown device, inasmuch as some of the levers and links are jointly utilized to accomplish the partial closing of the gate, and is adjusted for predetermined loads by positioning of the nuts 76 which may be moved in either direction on the threaded piston rod 74, thereby raising or lowering the lever 56 and the control finger 58. The combination of the load limit leverage together with the automatic shutdown device has the advantage of bringing the gate to synchronous speed no load position, when the overspeed switch or overcurrent relay or other protective device is actuated. When the abnormal condition causing the overspeed is rectified, the relay 89 may be reclosed to enable the unit which is at that time at synchronous speed, to participate immediately in supplying current to the distribution line.

It will be readily apparent to anyone skilled in the art that any of the other protective means mentioned in the first paragraph of the specification may be substituted for the manual, overspeed and overcurrent control specifically described herein, to energize the solenoid of the control valve and thus to control the operation of the prime mover dependent upon conditions other than overspeed or overcurrent.

It will thus be apparent that in the structure above described the servomotor 23 is directly controlled by the pilot valve pistons 31 which are normally actuated by the speed responsive governor which includes the motor 44, the flyballs 46, 47, the servomotor 48 and its connections with the pilot valve. The maximum gate opening and hence the power output of the unit is limited by the leverage 36, 51, 56 and 57 acting on the control finger 58 engageable with the spring mounted collar 62 on the stem 32 of the pilot valve. The action of the above power output limiting means is modified by the power cylinder 71 controlling the action of lever 77 by engagement therewith of nuts 76 on the piston rod 74, the movement of the piston 72 being controlled by valve 86 which is in turn controlled by overload relay 91, overspeed switch 94 or manual switch 93. The action of the modifying means is itself controlled by trigger 79 which may be tripped responsive to either abnormal or normal conditions as desired and may thus form either a protective means or a further normal control means.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a control system for a machine including a governor responsive to a condition related to the speed of the machine, means including a movable control member actuated by said governor for controlling the supply of energy to the machine and a load limit lever biased in one direction and acting on said control member, said control system comprising a leverage system arranged to actuate said lever for moving the said lever in the other direction to a first position corresponding to synchronous speed at no-load and a second position corresponding to complete shut-down of the machine, a normally biased motor arranged to move said leverage to a position corresponding to the said second position of said lever, a stop for limiting the biasing movement of said motor and said leverage to a position corresponding to the first said position of said lever, means for energizing said motor for effecting the movement thereof against its bias to move said leverage away from said positions, means for de-energizing said motor in response to a condition of the machine incident to normal operation thereof, and means to render said stop ineffective in response to an abnormal condition of the machine.

2. In a control system for a machine including a governor responsive to a condition related to the speed of the machine, means including a movable control member actuated by said governor for controlling the supply of energy to the machine and a load limit lever biased in one direction and acting on said control member, said control system comprising a leverage system arranged to actuate said lever for moving said lever in the other direction to a first position corresponding to synchronous speed at no-load and a second position corresponding to complete shut-down of the machine, a normally biased motor arranged to move said leverage to a position corresponding to said second position of said lever, a stop for limiting the biasing movement of said motor and said leverage to a position corresponding to the first said position of said lever, said stop being adjustable to vary the first said position within predetermined limits, means for energizing said motor for effecting the movement thereof against said bias to move said leverage away from said positions, means for de-energizing said motor in response to a condition of the machine incident to normal operation thereof, and means to render said stop ineffective in response to an abnormal condition of the machine.

3. In a control system for a machine including a governor responsive to a condition related to the speed of the machine, means including a movable control member actuated by said governor for controlling the supply of energy to the machine and a load limit lever biased in one direction and acting on said control member, said control system comprising a leverage system arranged to actuate said lever for moving said lever in the other direction to a first position corresponding to synchronous speed at no-load and a second position corresponding to complete shut-down of the machine, a normally biased motor arranged to move said leverage to a position corresponding to the said second position of said lever, a solenoid operated stop for limiting the biasing movement of said motor and said leverage to a position corresponding to the first said position of said lever, the operating solenoid of said stop being energized responsive to a condition occurring only during abnormal operation of the machine, means for energizing said motor for effecting the movement thereof against its bias to move said leverage away from said positions, means for de-energizing said motor in response to a condition of the machine incident to normal operation thereof, and means to render said stop ineffective in response to an abnormal condition of the machine.

4. In a control system for a machine including a governor responsive to a condition related to the speed of the machine, means including a movable control member actuated by said governor for controlling the supply of energy to the machine and a load limit lever biased in one direction and acting on said control member, said control system comprising a leverage system arranged to actuate said lever for moving said lever in the other direction to a first position corresponding to synchronous speed at no-load and a second position corresponding to complete shut-down of the machine, a fluid pressure operated servomotor normally biased to move said leverage to a position corresponding to the said second position of said lever, a stop for limiting the biasing movement of said motor and said leverage to a position corresponding to the first said position of said lever, means for energizing said motor for effecting movement thereof against its bias to move said leverage away from said positions, a valve for controlling de-energization of said motor in response to a condition of the machine incident to normal operation thereof, and means to render said stop ineffective in response to an abnormal condition of the machine.

JOSEPH J. RING.
BEVERLY R. NICHOLS.